(12) United States Patent
Esteve Balducci et al.

(10) Patent No.: US 10,042,858 B2
(45) Date of Patent: Aug. 7, 2018

(54) SYNCHRONIZING MULTIPLE CLASSES WITH DISPARATE SCHEMAS IN THE SAME COLLECTION

(71) Applicant: Microsoft Technology Licensing, LLC, Redmond, WA (US)

(72) Inventors: Juan V. Esteve Balducci, Sammamish, WA (US); John Allen Atwood, Duvall, WA (US); Samuel Neely, Sammamish, WA (US); Kevin Resnick, Olathe, KS (US); Adrian Dragomir, Bellevue, WA (US); Gregory A. Bolles, Snohomish, WA (US); Katy Chia-wen Chen, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/755,617

(22) Filed: Jun. 30, 2015

(65) Prior Publication Data
US 2015/0302023 A1    Oct. 22, 2015

Related U.S. Application Data

(63) Continuation of application No. 12/334,314, filed on Dec. 12, 2008.

(51) Int. Cl.
*G06F 17/30* (2006.01)
*G06Q 10/10* (2012.01)
(Continued)

(52) U.S. Cl.
CPC .. *G06F 17/30176* (2013.01); *G06F 17/30091* (2013.01); *G06F 17/30578* (2013.01);
(Continued)

(58) Field of Classification Search
CPC ................................................. G06F 17/30176
See application file for complete search history.

(56) References Cited

U.S. PATENT DOCUMENTS

| 5,333,266 A | 7/1994 | Boaz et al. |
| 6,151,606 A * | 11/2000 | Mendez ................ G06F 9/54 |
| | | 707/610 |

(Continued)

OTHER PUBLICATIONS

Tutorials Point, WML <select> Tag, https://web.archive.org/web/20071218125457/https://www.tutorialspoint.com/wml/wml_select_tag.htm, Wayback Machine date Dec. 18, 2007.*

(Continued)

*Primary Examiner* — Alexey Shmatov

(57) ABSTRACT

The embodiments described herein generally relate to a method and system for synchronizing multiple classes with disparate schemas in a single collection through the use of the same synchronization request and/or synchronization key. A collection of different types of items may be synchronized while using the unique schema for each class. Further, different synchronization options, e.g., filtering, truncation, and body settings, may be applied to each class. In a synchronization request, an option block within a synchronization command notifies the server to synchronize the class specified in the option block. The option block may also specify the options, or settings, if any, to apply to the class. Multiple option blocks may be included in the synchronization command to specify the synchronization of multiple classes. Where multiple classes are specified, the server responds with the synchronized items of all such classes while maintaining each class's unique schema.

16 Claims, 7 Drawing Sheets

(51) Int. Cl.
*H04L 12/58* (2006.01)
*H04L 29/08* (2006.01)

(52) U.S. Cl.
CPC ..... *G06F 17/30864* (2013.01); *G06Q 10/107* (2013.01); *H04L 51/38* (2013.01); *H04L 67/1095* (2013.01)

(56) References Cited

U.S. PATENT DOCUMENTS

| | | | |
|---|---|---|---|
| 6,760,339 | B1 | 7/2004 | Noel et al. |
| 7,130,885 | B2 | 10/2006 | Chandra et al. |
| 7,428,546 | B2 | 9/2008 | Nod et al. |
| 8,185,494 | B2 | 5/2012 | Davis et al. |
| 2004/0003302 | A1 | 1/2004 | Marshall et al. |
| 2004/0103174 | A1 | 5/2004 | Balducci et al. |
| 2004/0133644 | A1* | 7/2004 | Warren ............... H04L 12/58 709/206 |
| 2004/0225731 | A1 | 11/2004 | Piispanen et al. |
| 2005/0125621 | A1 | 6/2005 | Shah |
| 2006/0172724 | A1 | 8/2006 | Linkert et al. |
| 2007/0073899 | A1 | 3/2007 | Judge et al. |
| 2008/0049714 | A1 | 2/2008 | Commarford et al. |
| 2008/0109737 | A1 | 5/2008 | Schaeffer et al. |
| 2009/0083441 | A1 | 3/2009 | Clark et al. |
| 2009/0125131 | A1 | 5/2009 | Eldridge et al. |

OTHER PUBLICATIONS

"Laplink PDA Sync User Guide'", Published on: May 2007, Available At: http://web.archive.org/web/20071015050049/http://www.laplink.com/pdasync/PDAsync_UG_EN.pdf.

Bley, Thomas, "Simple Groupware SyncML Integration", Retrieved on: Oct. 8, 2008, Available at: http://web.archive.org/web/20081016004200/http://www.simple-groupware.de/cms/Main/SimpleGroupwareSyncML.

LIAMCA, "Microsoft Sync Framework", Retrieved on: Oct. 8, 2008, Available At: http://web.archive.org/web/20081017083125/http://blogs.msdn.com/sync.

"Non-Final Office Action Issued in U.S. Appl. No. 12/334,314", dated May 18, 2011, 24 Pages.

"Final Office Action Issued in U.S. Appl. No. 12/334,314", dated Nov. 21, 2011, 20 Pages.

"Non-Final Office Action Issued in U.S. Appl. No. 12/334,314", dated Aug. 20, 2012, 28 Pages.

"Final Office Action Issued in U.S. Appl. No. 12/334,314", dated Apr. 29, 2014, 12 Pages.

"Non-Final Office Action Issued in U.S. Appl. No. 12/334,314", dated Sep. 10, 2014, 15 Pages.

"Final Office Action Issued in U.S. Appl. No. 12/334,314", dated Mar. 31, 2015, 12 Pages.

Jervis, Michael, "SitePoint Website", Published on: Nov. 26, 2002, Available at: http://www.sitepoint.com/xml-dtds-xml-schema/.

* cited by examiner

SYNCHRONIZING MULTIPLE CLASSES WITH DISPARATE SCHEMAS IN THE SAME COLLECTION

BACKGROUND

While the use of electronic devices continues to grow, an increasing number of users of these devices desire to incorporate the use of small computer devices with their other computing systems. For example, users often desire to incorporate voice mail messages, electronic mail (email), short message service (SMS) messages, contacts, notes, calendar-type application appointments, and/or tasks between their mobile, or handheld, devices and their client computer or server at their place of employment and/or home. Such incorporation allows users to track their messages, email, calendar-type application appointments, contacts, notes, and/or tasks, etc. from nearly any location and at any time of day with their mobile device. While such incorporation is desired, it is also desired to synchronize these voice mail messages, email, calendar-type application appointments, contacts, notes, and/or tasks, etc. amongst the user's mobile device(s), client computer(s), and server(s) such that changes made at any of the devices may be reflected across all devices.

However, when a particular folder or collection of items is synchronized, a common schema is typically applied to all items, e.g., email, voice mail, calendar-type application appointments, tasks, contacts, notes, etc., in that folder regardless of the differences in the classes of items present in the collection. Further, the same options are applied to all classes within the collection. For example, the same filters are applied to each class, as well as the same truncation and body type settings. Where all classes are synchronized altogether and according to a common schema for the entire folder, the synchronization of some class items may be lost where one of the computing systems does not support the particular class of items. For example, a mobile device may not support the receipt of tasks, for example. Alternatively, the user may experience a poor viewing experience in attempting to open a particular message not supported by its system.

Although specific problems have been addressed in this Background, this disclosure is not intended in any way to be limited to solving those specific problems.

SUMMARY

Embodiments generally relate to synchronizing multiple classes with disparate schema per class in the same collection or folder through the use of the same synchronization request. Thus, items are synchronized amongst a mobile device, a client computer, and a message server, for example. Any number of types of computing systems known to or understood by those of ordinary skill in the art may be synchronized amongst the other applicable computing systems. By allowing for multiple classes within a collection to have disparate schema appropriate to each particular class of items, e.g., an email schema for email and a voice mail schema for voice mail, a collection of different types of items may be synchronized while still using the unique schema and, thus, properties, for each type of class of items. Further, by allowing for multiple classes with disparate schemas to be synchronized within the same collection while maintaining each class's unique schema, different options may be applied to each different class of items, if desired, in accordance with another embodiment. For example, different filtering, truncation, and body type options may be applied to each specific class. Any number of options, option settings, and types of details specific to such options and option settings as known to or understood by those of ordinary skill in the art may be available in accordance with embodiments disclosed herein. In a particular embodiment, these multiple classes with disparate schemas within a collection are synchronized by using multiple option blocks within a synchronization command. The presence of an option block in a synchronization command notifies the server to synchronize the class specified in the option block. Each such option block represents a single class of item(s) for synchronization. The option block specifies the options, or settings, if any, to apply to the class specified according to an aspect of an embodiment. Where multiple classes have been specified to be synchronized, the response from the applicable server to the synchronization request includes the synchronized items of all classes specified and with each class maintaining its unique schema.

This Summary is provided to introduce a selection of concepts in a simplified form that is further described below in the Detailed Description. This Summary is not intended to identify key or essential features of the claimed subject matter, nor is it intended to be used in any way as to limit the scope of the claimed subject matter.

BRIEF DESCRIPTION OF THE DRAWINGS

Embodiments of the present disclosure may be more readily described by reference to the accompanying drawings in which like numerals refer to like items.

DETAILED DESCRIPTION

Figure 1:
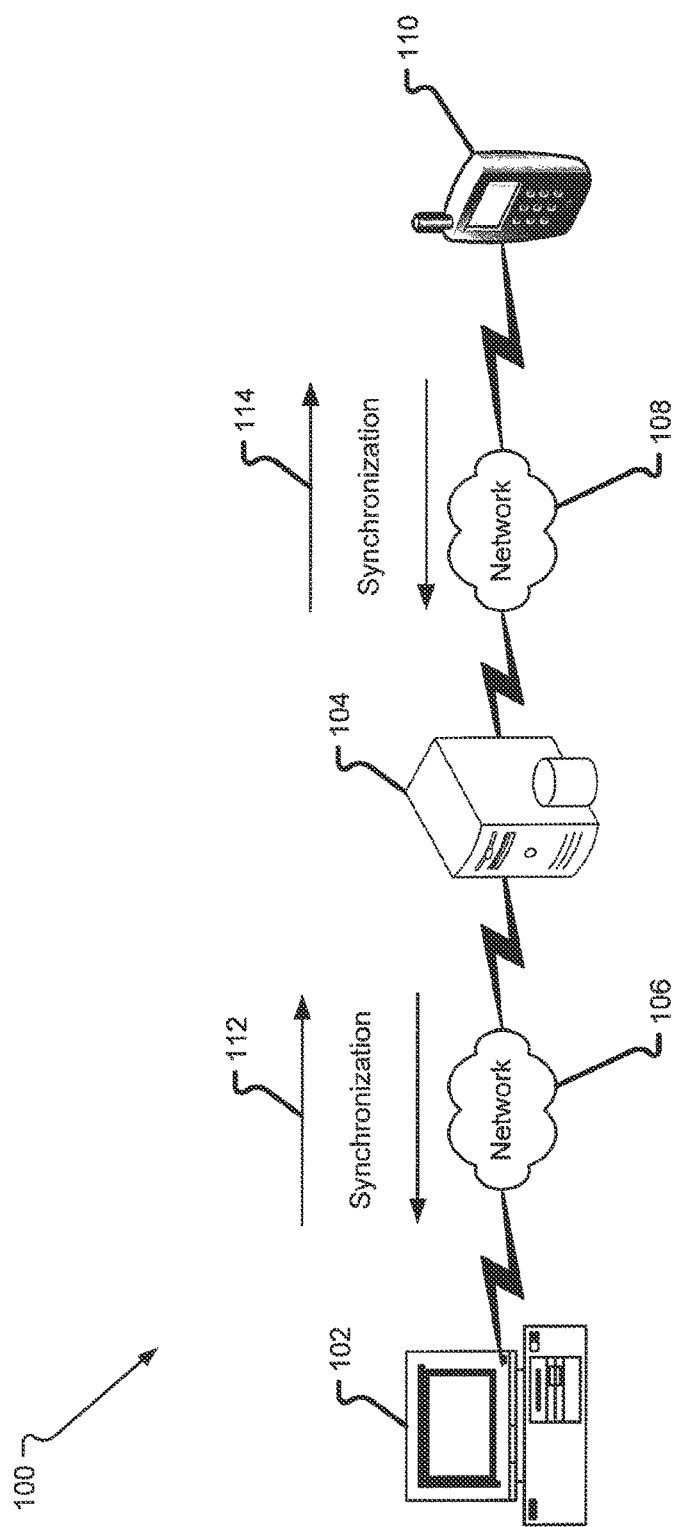
FIG. 1 illustrates an exemplary logical representation of an environment or system for synchronizing multiple classes with disparate schemas within the same collection in accordance with an embodiment of the present disclosure.

This disclosure will now more fully describe exemplary embodiments with reference to the accompanying drawings, in which specific embodiments are shown. Other aspects may, however, be embodied in many different forms and the inclusion of specific embodiments in this disclosure should not be construed as limiting such aspects to the embodiments set forth herein. Rather, the embodiments depicted in the drawings are included to provide a disclosure that is thorough and complete and which fully conveys the intended scope to those skilled in the art. Dashed lines may be used to show optional components or operations.

Embodiments generally relate to synchronizing multiple classes with disparate schemas within the same collection or folder through the use of the same synchronization transaction (request/response). Where synchronization is initiated, items are synchronized amongst a mobile device, a client, and a message server, for example, in accordance with embodiments. As noted, any number of types of computing systems known to or understood by those of ordinary skill in the art may be synchronized amongst the other applicable computing systems. Further, any type of synchronization key to initiate synchronization may be used as known to or understood by those of ordinary skill in the art without departing from the spirit and scope of the embodiments disclosed herein. Further yet, any type of class of items known to those of ordinary skill in the art may be used in accordance with embodiments disclosed herein. For example, classes may include voice mail messages, email, SMS messages, enhanced messaging service (EMS) messages, multimedia messaging service (MMS) messages, calendar-type application appointments, tasks, contacts, notes, etc. These example classes are offered for purposes of illustration only. Any number of types of classes may be available as known to or understood by those of ordinary skill in the art in accordance with embodiments disclosed herein.

In an embodiment, a request for synchronization may specify the particular class or classes of items within a folder that the user desires to have synchronized. The ability to select specific classes for synchronization allows for the multiple classes within a collection to maintain their unique, and different, schemas. Thus, each schema may have only those properties appropriate for its specific class, as opposed to having a common schema applicable to the collection as whole with the majority of properties named in such being inapplicable to the majority of classes in the collection. Accordingly, an SMS schema may be used for a SMS class, while a voice mail schema may be used for a voice mail class, even where both the SMS items and the voice mail items are located in the email folder. In an embodiment, a user may request that the SMS class be synchronized in the email folder, while not specifying the voice mail class. In such a situation, only the SMS items will be synchronized and returned with their individual schema to the device. As noted, these specific classes and folders are offered for purposes of illustration only and are in no way intended to be limiting. Any number of types of classes and folders may be used as known to or understood by those of ordinary skill in the art without departing from the spirit and scope of the present disclosure.

In accordance with embodiments disclosed herein, the class schemas are defined and published by developers in accordance with embodiments disclosed herein. For example, in an embodiment, client developers write code for the classes according to particular specification(s) which include schema definitions. In writing the schema definition for a particular class, properties are defined for the particular schema for that class, for example.

In another embodiment where both the SMS class and the voice mail class are selected for synchronization, the request for synchronization may specify the particular options to be applied in synchronizing each selected class. For example, the user may specify that all voice mail messages be filtered and that only SMS messages received within the last five (5) days be filtered in accordance with an embodiment. In other embodiments, the request for synchronization may also specify whether truncation of a message is desired so that only a portion of the message is sent to the devices to save bandwidth, local memory and processing, etc. Further, the request for synchronization may specify other options known to or understood by those of ordinary skill in the art, including body type, such as to have the body of a message be viewed in rich text format (RTF), HTML, etc. In an embodiment, where no class is specified, a default class is applied for a given folder. In another embodiment, where a class(es) is specified but no options are specified, default options are applied to the synchronization for a given collection. In yet another embodiment, a set of options is explicitly specified for a particular class even where no class is specified by the synchronization request.

An exemplary logical environment or system 100 for synchronizing multiple classes with disparate schemas within a collection between a client computer, a server, and a mobile device is shown in FIG. 1 in accordance with embodiments disclosed herein. The user of client computer 102 may also own mobile device 110. Any type of client computer 102 known to or understood by those of ordinary skill in the art may be used in accordance with embodiments. Messages, or other items, are sent between client computer 102 and server 104 through network 106. Client computer 102 also accesses messages stored on server 104 through network 106. These messages, or other items, are also sent to mobile device 110 through mobile device network 108.

Logical environment 100 is not limited to any particular implementation and instead embodies any computing environment upon which the functionality of the environment described herein may be practiced. Further, network 106, although shown as a single network may be any type of network conventionally known to or understood by those of ordinary skill in the art. In accordance with an exemplary embodiment, the network may be the global network (e.g., the Internet or World Wide Web, i.e., "Web" for short). It may also be a local area network, e.g., intranet, or a wide area network. In accordance with embodiments, communications over network 106 occur according to one or more standard packet-based formats, e.g., H.323, IP, Ethernet, and/or ATM. Further, mobile network 108 may use any kind of format known to or understood by those of ordinary skill in the art. Any conceivable environment or system may be understood by those of ordinary skill in the art. FIG. 1 is offered as an example only for purposes of understanding the teachings of the embodiments disclosed herein.

As shown in FIG. 1, messages, or other items, are synchronized among client computer 102, server 104, and user's mobile device 110. Changes to one of these computing devices are reflected across all devices. Where a user deletes a calendar appointment, for example, at mobile device 110, this calendar appointment is deleted from server 104 and client computer 102. Any type of item operation known to or understood by those of ordinary skill in the art may be synchronized amongst the client computer, server, and user's mobile device in accordance with embodiments. Synchronization thus occurs in multiple directions 112 and 114, as shown in FIG. 1. In an embodiment, where a SMS message, for example, is received by mobile device 110, the SMS message is transferred to server 104 from mobile device 110. In another embodiment, a SMS message received at server 104 from client computer 102 is transmitted to mobile device 110. Synchronization thus occurs from the mobile device to the server or from the server to the mobile device in an embodiment. Thus, if a change occurs at mobile device 110, the change is "synchronized up" to server 104 in an embodiment. In another embodiment, if a change occurs at server 104, the change is "synchronized down" to mobile device 110.

It is worth noting at the outset that FIG. 1 is merely an example of an environment for practicing the embodiments disclosed. For example, FIG. 1 shows server 104. However, embodiments also cover any type of server, separate servers, server farm, or other message server. Further yet, FIG. 1 shows mobile device 110. However, any type of small computer device, including any phone having data access, may be used as is reasonably known to or understood by those of ordinary skill in the art without departing from the spirit and scope of the embodiments disclosed herein. Indeed, mobile operator network 108, mobile device 110, client computer 102, and server 104 are valid ways of practicing embodiments disclosed herein but are in no way intended to limit the scope of the present disclosure. Further, the exemplary network environment 100 may be considered in terms of the specific components described, e.g., server, mobile device computing system, etc., or, alternatively, may be considered in terms of the analogous modules corresponding to such units.

Although only one mobile device 110, server 104, and client computer 102 are shown, for example, another embodiment provides for multiple small computer devices to communicate with server 104 and client computer 102. In an embodiment, each small computer device communicates with the same mobile operator network 108, or, in other embodiments, multiple and separate mobile operator networks communicate with the small computer devices. In yet another embodiment, each small computer device communicates with a separate mobile operator network.

Figure 2:
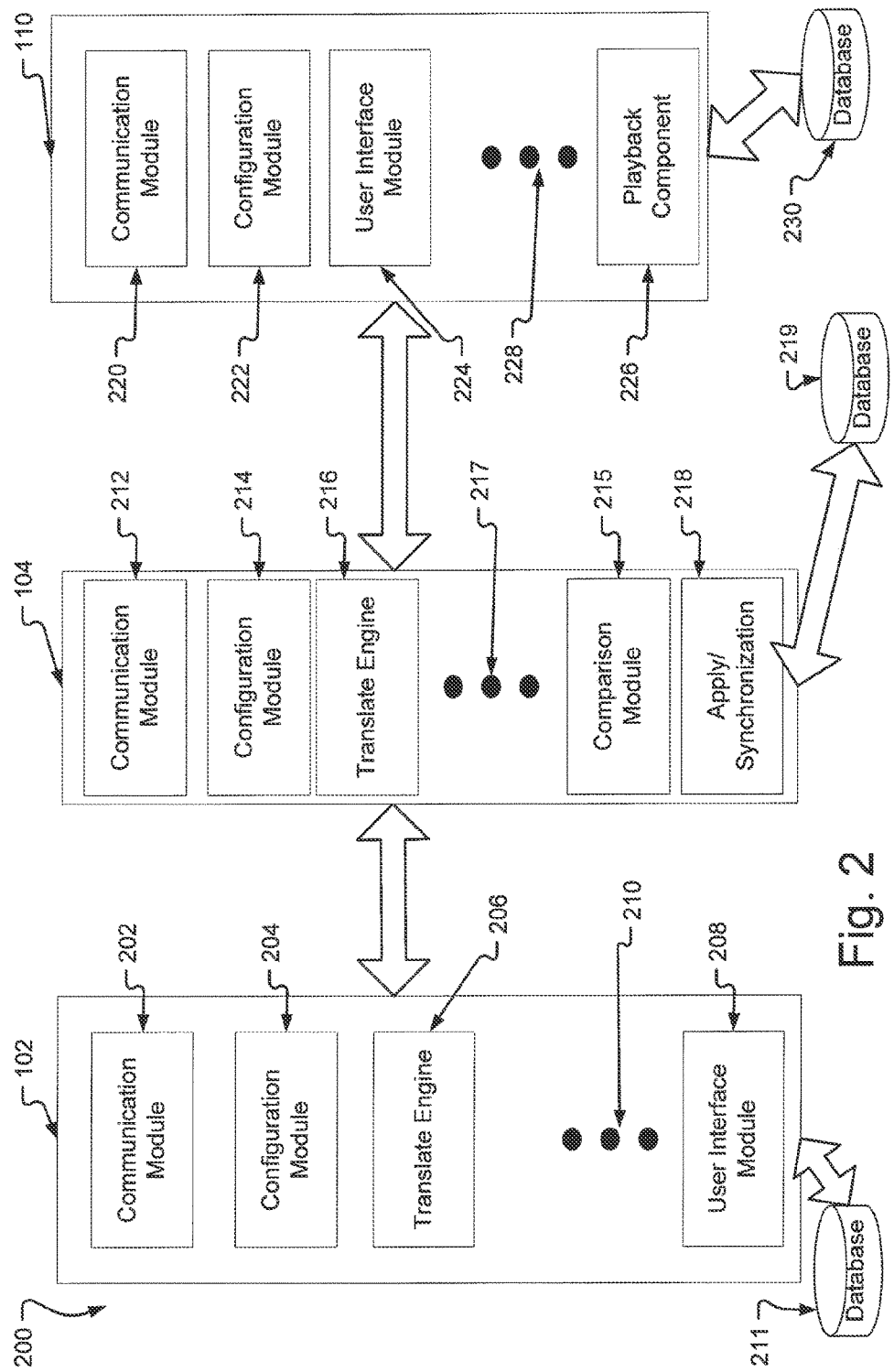
FIG. 2 depicts a logical representation of exemplary functional component modules for the client computing system, the server, and the mobile device depicted in FIG. 1 for synchronizing multiple classes with disparate schemas within the same collection in accordance with an embodiment of the present disclosure.

While FIG. 1 shows exemplary environment or system 100 for synchronizing multiple classes within a folder or collection, FIG. 2 illustrates exemplary software functional modules 200 corresponding to such computing units for enabling such synchronization in accordance with embodiments disclosed herein. Storage means 211, 219 and 230 are also depicted in FIG. 2. These storage means and functional modules are offered by way of example only. Any type of module, component, or storage means known to or understood by those of ordinary skill in the art may be used in accordance with embodiments. At client computer 102, communication module 202 provides for communications, such as the transmittal of data packets, between client computer 102 and server 104. These data packets include, for example, requests to synchronize specific classes within a folder, identification information for client computer, etc. Configuration module 204 configures client computer to send and receive data to and from server 104, synchronize messages, etc. Translation engine 206 translates messages, where necessary, that are received from server 104 to allow for viewing them in a proper format. User interface module 208 renders messages, prompts, etc. for viewing at client computer 102. Information/data stored in database 211 may be accessed, retrieved, searched, etc. As noted, these modules and databases are offered by way of example only. Other or additional modules or storage means as known to or understood by those of ordinary skill in the art may be employed, as shown by ellipses 210.

Turning to server 104, communication module 212 communicates with client computer 102 and mobile device 110, such as by transmitting data packets, according to an embodiment. Configuration module 214 configures for server 104 to send and receive data to and from client computer 102 and mobile device 110 and provides other capabilities, including synchronization. Translation engine 216 translates messages into formats appropriate for the mobile device 110 or client computer 102. For example, translation engine 216 changes the format of an email message from rich text format to XML, for example, before sending it to client computer 102 or mobile device 110. In one aspect of an embodiment, translation engine 216 receives a recorded voice mail message and translates it into a data file including text to send to mobile device 110 as a visually viewable message to be read through user interface 224. Any number of types of translations may occur as known to or understood by those of ordinary skill in the art in accordance with embodiments disclosed. Further, comparison module 215 compares the criteria specified for synchronization, e.g., the class or classes and/or options for the selected class or classes, against the stored items for each class on the folder and applies the selections for synchronization of those items with synchronization module 218. Information/data stored in database 219 may be accessed, retrieved, searched, etc. As noted, these modules and databases are offered by way of example only. As shown by ellipses 217, other or additional modules or storage means as known to or understood by those of ordinary skill in the art may be used.

Further, mobile device 110 includes communication module 220 for providing communications, such as the transmittal of data packets specifying classes desired for synchronization in a particular folder, between mobile device 110 and server 104 in accordance with an embodiment. Such data packets may include XML requests specifying the classes for synchronization and options and identification information of mobile device 110, for example. Configuration module 222 configures mobile device 110 to receive and send data from and to server 104 and provides other capabilities, including message viewing, synchronization capabilities, etc. Messages, prompts, queries, selection menus, etc. are displayed on mobile device 110 for viewing through user interface module 224. Further, playback component 226 provides for voice mails and other messages to be played back to the user using output device(s) on mobile device 110. Information/data stored in database 230 may be accessed, retrieved, searched, etc. As noted, while specific modules and databases are shown, other or additional modules or storage means as known to or understood by those of ordinary skill in the art may be used, as shown by ellipses 228.

Figure 3:
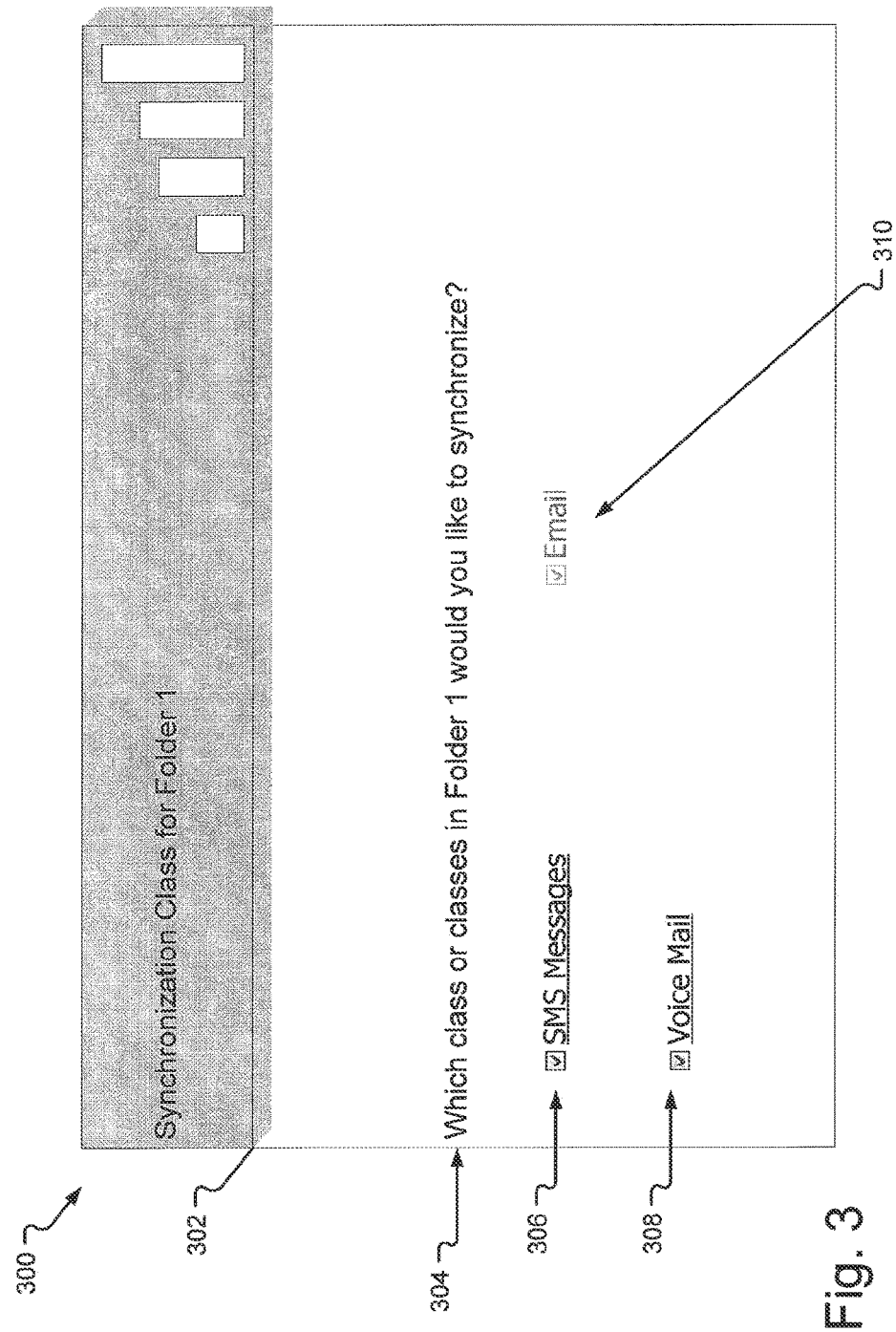
FIG. 3 illustrates an exemplary user interface showing different classes of items for a user to select for synchronization in accordance with an embodiment of the present disclosure.

While FIG. 2 includes user interface modules 208 and 224, FIG. 3 illustrates an exemplary user interface 300 on mobile device 110 in accordance with an embodiment disclosed herein. A similar type of user interface may be displayed on the user interface of client computer 102 in accordance with embodiments disclosed herein. In an embodiment, once it is indicated that synchronization of devices is desired, a user is prompted as to which class or classes of items he/she would like to synchronize. Query user interface 302 thus asks the user which class or classes in the specified folder or collection to synchronize 304. For example, query 304 asks, "Which class or classes in Folder 1 would you like to synchronize?" In embodiments, the user may select checkboxes 306, 308, and/or 310 to specify that he/she would like the selected class to be synchronized.

While checkboxes 306-310 are shown in FIG. 3, fields, buttons, or any type of selection mechanism known to or understood by those of ordinary skill in the art may be used without departing from the spirit and scope of the embodiments disclosed herein. In further embodiments, query user interface 302 shows the user which class or classes are available for synchronization by enabling the selection of such class or classes while disabling the selection of class or classes that are not available. As seen in query interface 302, SMS messages 306 and Voice Mail 308 are enabled, while Email 310 is disabled, for example. Such enabling and disabling of class selections may occur where a device is not capable of providing email messages to a user, for example. In such a case, instead of providing a poor experience to the user when it attempts to synchronize all messages, including email, or losing email synchronization altogether without informing the user, enabling and disabling mechanisms 306-310 inform the user that such synchronization is not available in accordance with embodiments disclosed herein. As discussed, FIG. 3 shows an exemplary user interface 300 that may be used according to embodiments. User interface 300 is offered for purposes of illustration only. Any number of types of user interfaces may be used as known to or understood by those of ordinary skill in the art in accordance with embodiments disclosed herein. In other embodiments, no user interface is used. Instead, an XML request specifying the class or classes for synchronization is sent without user interaction.

Figure 4:
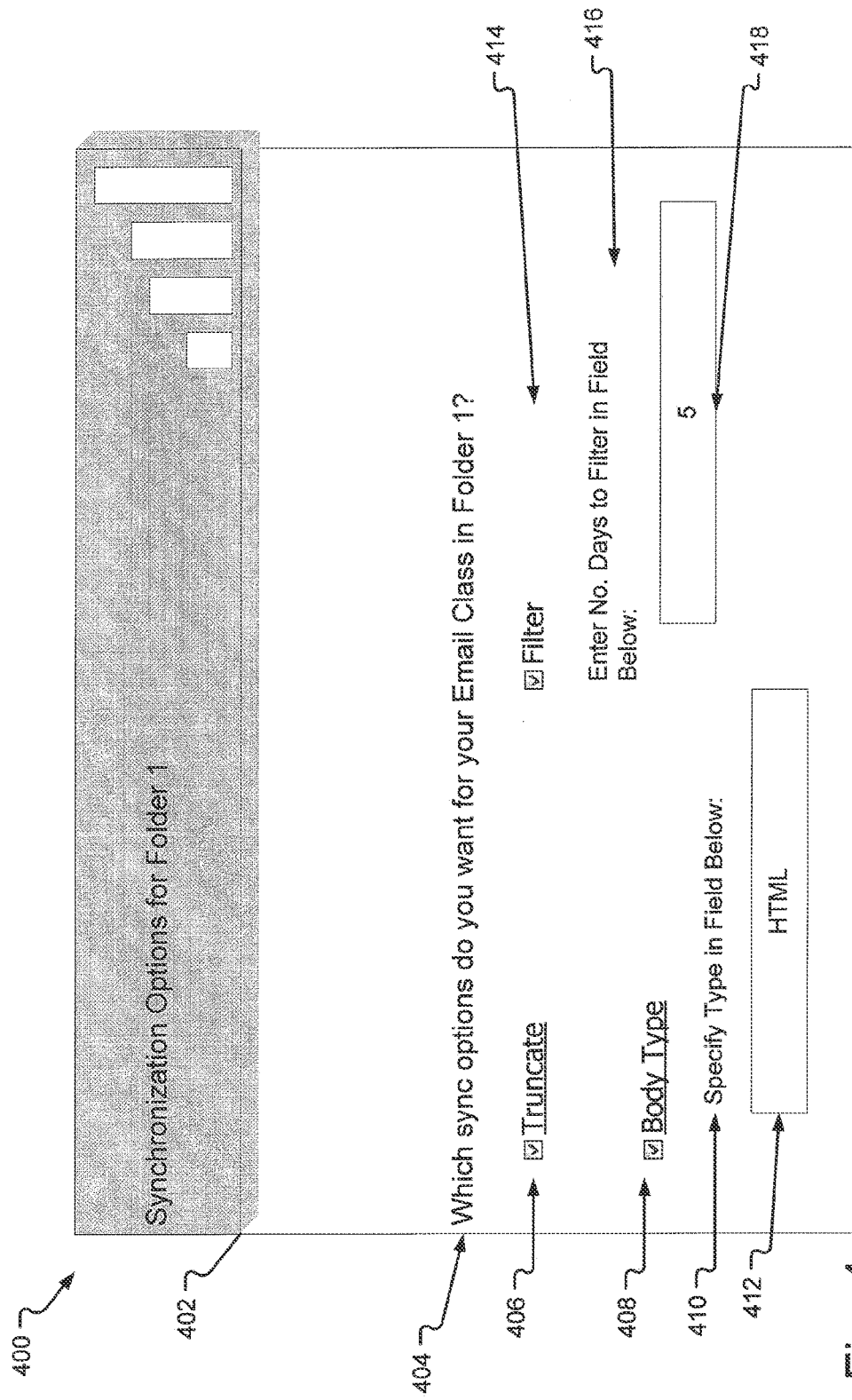
FIG. 4 depicts an exemplary user interface showing different options available for a user to select for applying to the class specified by the user in FIG. 3 in accordance with an embodiment of the present disclosure.

Upon selecting the class or classes in the specified folder or collection that the user would like to synchronize, FIG. 4 illustrates exemplary user interface 400 for allowing the user to specify the options desired for each selected class in that folder. Like user interface 300, a similar user interface 400 may be displayed on the user interface of client computer 102 or mobile device 110. For example, where the Email class was selected in query user interface 302, query option user interface 402 queries the user as to which option or options 404 it desires for the email class synchronization in the specified folder. For example, query 402 may ask the user, "Which sync options do you want for your Email Class in Folder 1?" Query 402 is offered by way of example only. Any type of query or other determination known to or understood by those of ordinary skill in the art may be used in accordance with embodiments disclosed herein. Possible options include truncate option 406, which may be selected by marking the checkbox for this option. Selecting this option will truncate messages synchronized to save bandwidth, etc. As another example, a user may choose to have the body type of email messages displayed in HTML format 408, as shown at 408, 410, and 412. Further, a user may enter the number of days of emails to filter in 414, 416, and 418. As shown, the user may enter the number of days by using field 418. While fields and checkboxes are shown in user interface 400, any number of types of selections and entry mechanisms may be used as known to or understood by those of ordinary skill in the art in accordance with embodiments disclosed herein. Further, in an embodiment, different options appropriate for the class specified may appear in user interface 400. For example, where the "task" class is selected for synchronization, an option may be available for a user to select whether it wants all tasks or only uncompleted tasks to be synchronized (not shown). In another embodiment, the options provided for viewing by the user include everything possible for all classes. In an aspect of an embodiment, only those options suitable for the particular class specified are enabled. In yet another aspect of an embodiment, no options are presented to users and a default set of options is pre-selected or automatically selected based on the device capabilities or any other variety of factors as known to or understood by those of ordinary skill in the art.

Figure 5:
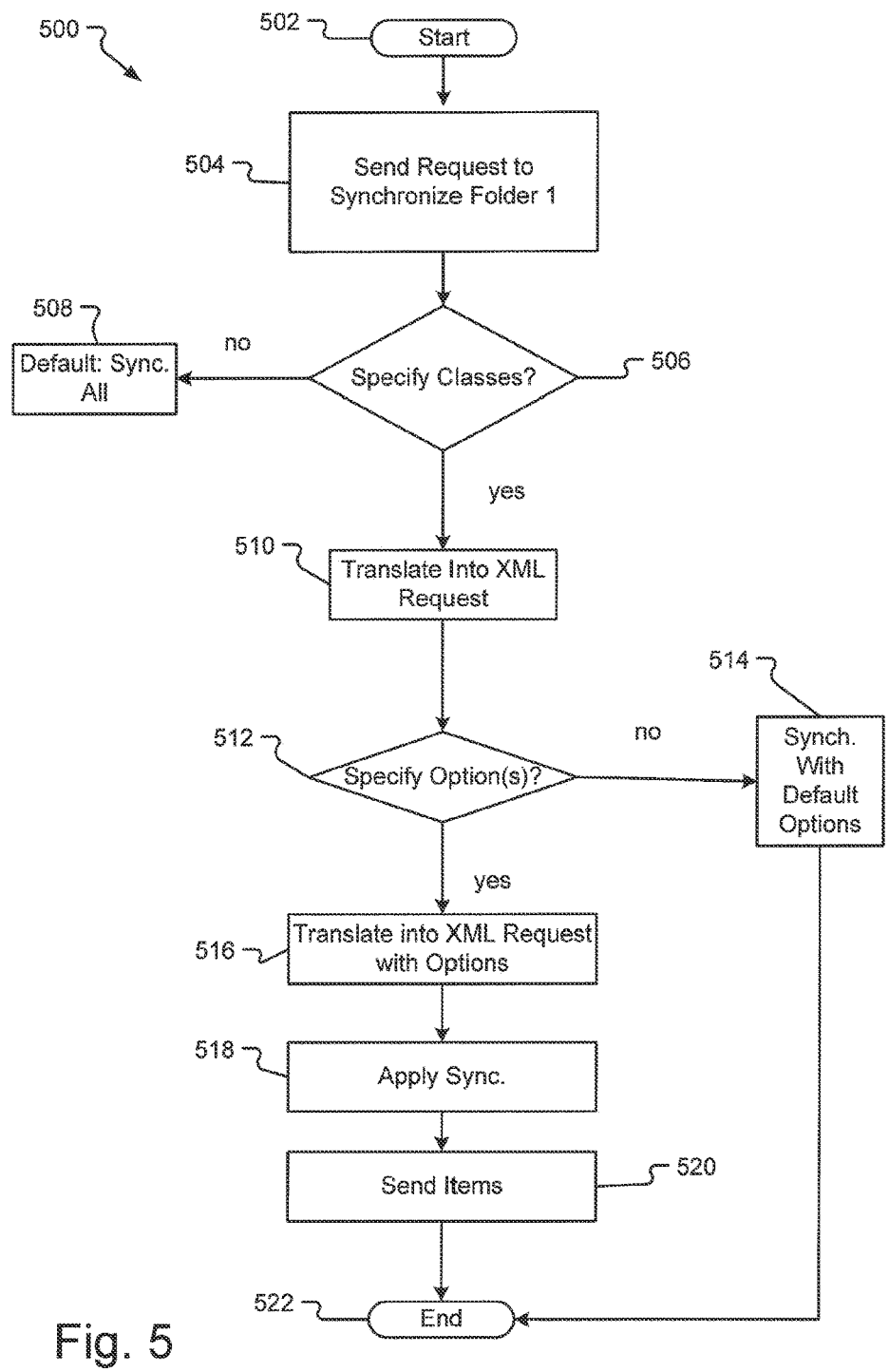
FIG. 5 depicts a flow diagram illustrating the operational characteristics of a process for requesting a specific class or classes with disparate schemas within a collection for synchronization in accordance with an embodiment of the present disclosure.

While FIGS. 3 and 4 show exemplary user interfaces for allowing a user to specify the class or classes and/or option(s) within a folder that the user desires to have synchronized, FIG. 5 depicts the operational steps 500 for synchronizing multiple classes with disparate schemas within a single folder or collection in accordance with embodiments disclosed herein. Start operation 502 is initiated and process 500 proceeds to send request to synchronize folder 1, for example, operation 504. The sending of this request could be in response to a user interface prompt or query, as shown in FIG. 3 in accordance with an embodiment, or the sending of the request could be a direct XML request. Where a general request to synchronize is sent, query operation 506 queries the user to specify which class or classes within the collection or folder that the user desires to have synchronized. If the user does not desire to specify a class or classes, process 500 branches NO to the default to synchronize all classes 508. If the user selects a class or classes for synchronization, process 500 branches YES to translate operation 510 in which the selected boxes, fields, and/or other selection mechanisms are translated into an XML request. Next, process 500 proceeds to query option operation 512 in which the user is queried as to which option(s) he/she would like to use for synchronization for the particular class or classes selected in operation 506. For example, query option operation 512 allows the user to select filtering, truncation, body type settings, etc., in accordance with embodiments disclosed herein. As noted, other options may be available for selection as known to or understood by those of ordinary skill in the art in accordance with embodiments disclosed herein. Further, any number of types of details specific to such options may be available as known to or understood by those of ordinary skill in the art. For example, where the "filtering" option is elected for email messages, one may select a specific length of time to set for the filtering option, such as email messages received in a specified number of days/weeks/months or specific dates, time periods, etc. As another example, where tasks are selected, the filtering option may be selected to specify a "complete" or "incomplete" setting for those tasks to be filtered. Where voicemails or SMS messages are selected, the filtering option may specify that undesired conversations be filtered, for example. Further, where "truncation" is selected, a certain size message may be specified or only the header information may be selected, for example. Further yet, where body type settings is selected, "HTML" or "rich text format" may be selected for email messages, for example. As noted, any number of types of options, option settings, and details specific to those options and option settings as known to or understood by those of ordinary skill in the art may be used without departing from the spirit and scope of the present disclosure. The examples offered herein are offered for purposes of illustration only and are in no way intended to be limiting.

If no options are selected, process 500 branches NO to the default 514 to synchronize the class or classes with the options specified by a common schema. If the user specifies the option(s) for synchronization, process 500 branches YES to translate operation 516, in which the boxes and fields or other selection/entry mechanisms for options indicated for the class or classes selected are translated into an XML request. Upon sending this XML request, the option(s) are applied against the items in the class or classes specified in the folder or collection and synchronized 518. The synchronized items are then sent to the devices in send operation 520, and process 500 terminates at end operation 522. FIG. 5 is merely an example of possible operational characteristics for the synchronization of multiple classes with disparate schemas process in accordance with embodiments disclosed herein. Operational steps depicted may be combined into other steps, or additional steps may be added, for example.

As noted, the synchronization of specific classes with disparate schemas within a single folder or collection may be initiated through user interaction as shown in FIGS. 3 and 4, in accordance with embodiments disclosed herein. Alternatively, as noted, this synchronization may be initiated directly through an XML request. This XML request may also result from translating selections made by the user at a user interface for specifying classes and option(s) for synchronization in accordance with an embodiment disclosed herein. In embodiments, multiple classes with disparate schemas within a collection are synchronized by using multiple option blocks as part of a collection within a synchronization command. The presence of an option block notifies the server to synchronize the class specified in the option block. Each such option block represents a single class of items for synchronization. The option block specifies the options, or settings, if any, to apply to the class specified according to an aspect of an embodiment. Where multiple classes have been specified to be synchronized, the response from the applicable server to the synchronization request includes the synchronized items of all classes specified and with each class maintaining its unique schema.

Table 1 below provides an example XML synchronization request for using option blocks to notify the server to synchronize a class specified in the option block in accordance with embodiments disclosed herein. In embodiments, the options, or settings, for the synchronization of the specified class in the option block are also specified. Table 1 is offered for purposes of illustration only and is in no way intended to be limiting. As noted, any number of types of options, specific settings, and details specific to those options and settings as reasonably known to or understood by those of ordinary skill in the art may be used in accordance with embodiments disclosed herein. Further, while Table 1 shows the use of option blocks in an example synchronization command, any number of types of option blocks or other mechanisms, synchronization commands, etc., may be used as known to or understood by those of ordinary skill in the art in accordance with embodiments disclosed herein. For example, <CollectionID>15</CollectionID> in Table 1 below indicates synchronization of the Email folder is desired. Option blocks below show that the SMS class, <Class>SMS</Class>, for example, is to be synchronized with the specific settings, e.g., TruncationSize, BodyPreference, Filter, etc., shown for that class:

TABLE 1

Example Use of Option Blocks as Part of
a Collection in a Synchronization Command

```
<Sync xmlns="AirSync:" >
  <Collections>
    <Collection>
      <SyncKey>601771687</SyncKey>
      <CollectionId>15</CollectionId>
      <DeletesAsMoves/>
      <GetChanges/>
      <WindowSize>100</WindowSize>
      <Options>
```

TABLE 1-continued

Example Use of Option Blocks as Part of
a Collection in a Synchronization Command

```
        <Class>SMS</Class>
        <FilterType>0</FilterType>
        <BodyPreference>
            <Type>1</Type>
            <TruncationSize>102400</TruncationSize>
        </BodyPreference>
      </Options>
      <Options>
        <FilterType>2</FilterType>
        <BodyPreference><Type>1</Type></BodyPreference>
        <BodyPreference><Type>2</Type></BodyPreference>
        <BodyPreference>
            <Type>4</Type>
            <TruncationSize>102400</TruncationSize>
        </BodyPreference>
        <MIMESupport>0</MIMESupport>
            <Conflict>1</Conflict>
      </Options>
    </Collection>
  </Collections>
</Sync>
```

Figure 6:
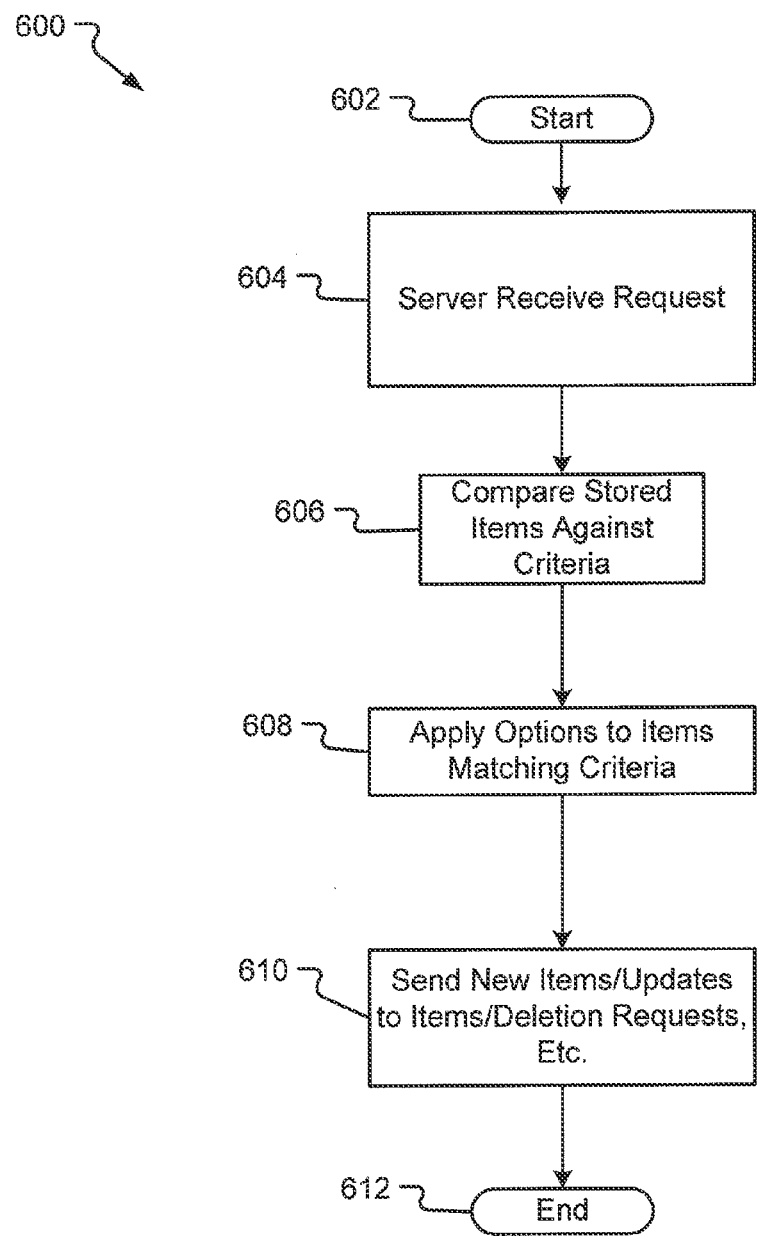
FIG. 6 illustrates a flow diagram illustrating the operational characteristics of a process for determining the items to synchronize based on a request, such as that provided in FIG. 5 for example, in accordance with an embodiment of the present disclosure.

Turning to FIG. 6, process 600 depicts the operational steps for server 104, for example, to synchronize the class or classes specified for synchronization within a single folder and according to the options specified, if any, for such class or classes in accordance with embodiments disclosed herein. Start operation 602 is initiated and process 600 proceeds to server receive request for synchronization operation 604. Upon receiving this request, server 104 compares items 606 stored in the specified folder in server 104 against the criteria for the class(es) and/or option(s) specified. After comparing the items stored against the criteria specified, server 104 applies the options to the items matching the criteria 608. Server 104 then sends 610 the necessary new items, updates to items and deletion requests, for example, to keep client computer 102 and mobile device 110 synchronized, or "in-sync" with each other. Process 600 terminates at end operation 612. FIG. 6 is merely an example of possible operational characteristics for the synchronization of multiple classes with disparate schemas process in accordance with embodiments disclosed herein. Operational steps depicted may be combined into other steps, or additional steps may be added, for example.

Figure 7:
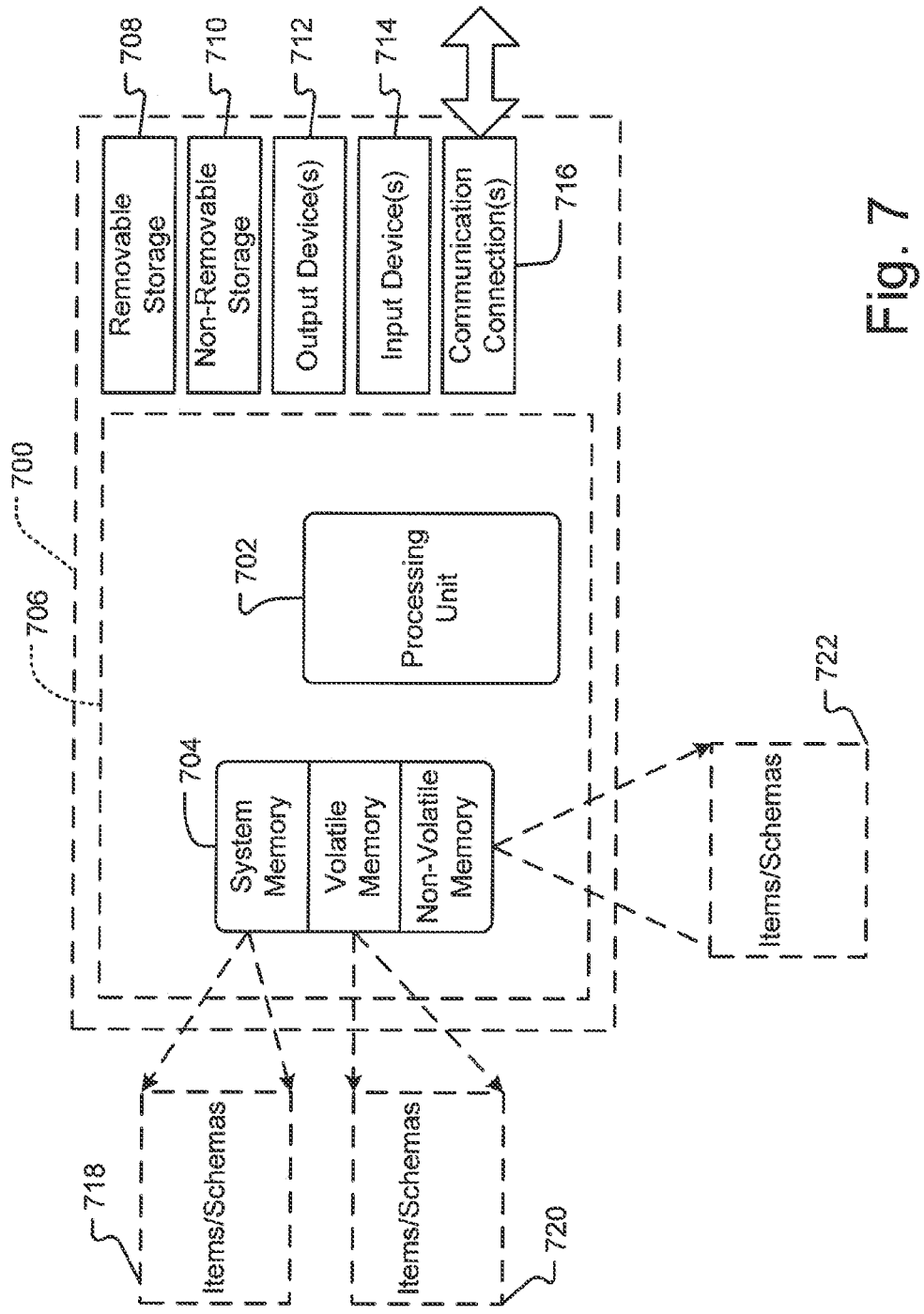
FIG. 7 depicts an exemplary computing system upon which embodiments of the present disclosure may be implemented.

Finally, FIG. 7 illustrates an exemplary computing system 700 upon which embodiments disclosed herein may be implemented. A computer system 700, such as client computer 102, mobile device 110, or server 104, which has at least one processor 702 for synchronizing items as shown in FIG. 1, is depicted in accordance with embodiments disclosed herein. The system 700 has a memory 704, in which an item, or message, and/or schema, for example 718 (or 720 or 722) is located. In its most basic configuration, computing system 700 is illustrated in FIG. 7 by dashed line 706. Additionally, system 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer readable instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired processing information for synchronization, for example, and which can be accessed by system 700. Any such computer storage media may be part of system 700. Depending on the configuration and type of computing device, memory 704 may be volatile, non-volatile or some combination of the two. With respect to memory 704, the messages, voice mails, appointments, tasks, etc., of embodiments disclosed herein could be in system memory 718, volatile memory 720, or non-volatile memory 722 in accordance with embodiments. The illustration in FIG. 7 is intended in no way to limit the scope of the present disclosure. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System 700 may also contain communications connection(s) 716 that allow the device to communicate with other devices. Additionally, to input content into the fields of the UI on mobile device 110 as provided by UI module 224, for example, in accordance with an embodiment of the present disclosure, system 700 may have input device(s) 714 such as a keyboard, mouse, pen, voice input device, touch input device, etc. Output device(s) 712 such as a display, speakers, printer, etc. may also be included, in which such devices may be used to display the UI for viewing messages, selecting specific class(es) for synchronization, etc., in accordance with embodiments. All of these devices are well known in the art and need not be discussed at length here.

Having described embodiments of the present disclosure with reference to the figures above, it should be appreciated that numerous modifications may be made to the embodiments that will readily suggest themselves to those skilled in the art and which are encompassed within the scope and spirit of the present disclosure and as defined in the appended claims. Indeed, while embodiments have been described for purposes of this disclosure, various changes and modifications may be made which are well within the scope of the present disclosure.

Similarly, although this disclosure has used language specific to structural features, methodological acts, and computer-readable media containing such acts, it is to be understood that the subject matter defined in the appended claims is not necessarily limited to the specific structure, acts, features, or media described herein. Rather, the specific structures, features, acts, and/or media described above are disclosed as example forms of implementing the claims. Aspects of embodiments allow for multiple client applications, multiple data packet types, etc. Or, in other embodiments, a single client computer with a single server and single mobile device are used. One skilled in the art will recognize other embodiments or improvements that are within the scope and spirit of the present disclosure. Therefore, the specific structure, acts, or media are disclosed as exemplary embodiments of implementing the present disclosure. The disclosure is defined by the appended claims.

What is claimed is:

1. A system for synchronizing a plurality of classes of user communication items, comprising:
   a processor;
   a memory communicatively connected to the processor, the memory storing a schema for each class of a plurality of classes of items, the memory further storing instructions which, when executed by the processor, cause the system to perform a method of synchronizing a plurality of classes, the method comprising:
      receiving from a mobile device a request including a selection of a folder to synchronize from among a plurality of folders each containing a plurality of items, wherein the folder comprises a logical collection of data presented to a user as a single collection of items separate from items belonging to other folders of the plurality of folders, the folder including the plurality of classes of items, the request comprising an XML message including an identification of the folder and at least one option block including synchronization options;
      maintaining a schema for each class within the selected folder, wherein each schema is unique to its class such that a first class has a first schema and a second class has a second schema different from the first schema;
      receiving from the mobile device a selection of the first class and the second class within the selected folder to synchronize, the first class and the second class being identified in the at least one option block;
      receiving from the mobile device a selection of a first option to apply to the selected first class and a second option to apply to the selected second class, wherein the first option and the second option specify synchronization settings to apply to the first class and the second class respectively, and wherein the first option specifies different synchronization settings than the second option, the first option and the second option being included in the at least one option block and specific to the first and second schemas, the at least one option block being included within a set of synchronization settings for the selected folder within the XML message; and
      responding with items for synchronization at the mobile device by applying the first option to items within the selected folder belonging to the selected first class and applying the second option to items within the selected folder belonging to the second selected class.

2. The system of claim 1, further comprising a server computing system, wherein the server computing system includes the processor and memory.

3. The system of claim 1, wherein the first class comprises an email class and the second class comprises a calendar class.

4. The system of claim 1, wherein the first option comprises a first body type preference and the second option comprises a second body type preference, different from the first body type preference.

5. The system of claim 1, wherein the responding with the items comprises:
   responding with new items and modified items; and
   maintaining the unique schema of each class of items synchronized.

6. A system for synchronizing a plurality of classes of user communication items, comprising:
a processor;
a memory communicatively connected to the processor, the memory storing instructions which, when executed by the processor, cause the system to perform a method of synchronizing a plurality of classes, the method comprising:
transmitting to a server a selection of a folder to synchronize from among a plurality of folders each containing a plurality of items in a synchronization request, wherein the folder comprises a logical collection of data presented to a user as a single collection of items separate from items belonging to other folders of the plurality of folders, the folder including the plurality of classes of items, each class of the plurality of classes has an associated schema, and wherein each schema is unique to its class such that a first class has a first schema and a second class has a second schema different from the first schema;
transmitting to the server a selection of the first class and the second class within the selected folder to synchronize as part of at least one option block included in the synchronization request;
transmitting to the server a selection of a first option to apply to the selected first class and a second option to apply to the selected second class, wherein the first option and the second option specify synchronization settings to apply to the first class and the second class respectively, and wherein the first option specifies different synchronization settings than the second option, the first option and the second option being included in the at least one option block and specific to the first and second schemas, the at least one option block being included within a set of synchronization settings for the selected folder within the XML message; and
receiving items for synchronization based on application of the first option to items within the selected folder belonging to the selected first class and applying the second option to items within the selected folder belonging to the second selected class.

7. The system of claim 6, wherein the first option comprises a first body type preference and the second option comprises a second body type preference, different from the first body type preference.

8. The system of claim 7, wherein receiving items for synchronization includes receiving a first item having a first body type according to the first body type preference and a second item having a second body type according to a second body type preference.

9. The system of claim 8, wherein the first body preference type and the second body preference type are selected from among an HTML body type and a rich text format body type.

10. The system of claim 8, wherein the first class comprises an email class and the second class comprises a calendar class.

11. The system of claim 8, wherein the processor and memory are included in a mobile device communicatively connected to the server.

12. The system of claim 8, wherein the selection of the folder to synchronize comprises a collection identifier.

13. A method of synchronizing a plurality of classes of user communication items, comprising:
receiving from a mobile device a request including a selection of a folder to synchronize from among a plurality of folders each containing a plurality of items, wherein the folder comprises a logical collection of data presented to a user as a single collection of items separate from items belonging to other folders of the plurality of folders, the folder including a plurality of classes of items, the request comprising an XML message including an identification of the folder and at least one option block including synchronization options;
maintaining a schema for each class within the selected folder, wherein each schema is unique to its class such that a first class has a first schema and a second class has a second schema different from the first schema;
receiving from the mobile device a selection of the first class and the second class within the selected folder to synchronize, the first class and the second class being identified in the at least one option block;
receiving from the mobile device a selection of a first option to apply to the selected first class and a second option to apply to the selected second class, wherein the first option and the second option specify synchronization settings to apply to the first class and the second class respectively, and wherein the first option specifies different synchronization settings than the second option, the first option and the second option being included in the at least one option block and specific to the first and second schemas, the at least one option block being included within a set of synchronization settings for the selected folder within the XML message; and
responding with items for synchronization at the mobile device by applying the first option to items within the selected folder belonging to the selected first class and applying the second option to items within the selected folder belonging to the second selected class.

14. The method of claim 13, wherein the first option comprises a first body type preference and the second option comprises a second body type preference, different from the first body type preference.

15. The method of claim 13, wherein the first class comprises an email class and the second class comprises a calendar class.

16. The method of claim 13, wherein the responding with the items comprises:
responding with new items and modified items; and
maintaining the unique schema of each class of items synchronized.

* * * * *